United States Patent [19]

McKay

[11] 4,257,876

[45] Mar. 24, 1981

[54] PASSIVATION OF METALS CONTAMINATING A CRACKING CATALYST WITH TRIHYDROCARBYLANTIMONY OXIDE AND PROCESS FOR CONVERTING HYDROCARBONS

[75] Inventor: Dwight L. McKay, Bartlesville, Okla.

[73] Assignee: Phillips Petroleum Company, Bartlesville, Okla.

[21] Appl. No.: 90,839

[22] Filed: Nov. 2, 1979

Related U.S. Application Data

[62] Division of Ser. No. 926,694, Jul. 25, 1978, abandoned.

[51] Int. Cl.$^3$ .................... C10G 11/05; C10G 9/16; C10G 37/14
[52] U.S. Cl. .................... 208/120; 208/52 Ct; 252/411 R; 252/414; 252/416; 252/455 Z; 252/456; 260/446
[58] Field of Search .................... 208/52 CT, 120; 252/411 R

[56] References Cited

U.S. PATENT DOCUMENTS

| | | | |
|---|---|---|---|
| 3,506,567 | 4/1970 | Barger et al. | 208/89 |
| 3,711,422 | 1/1973 | Johnson et al. | 252/414 |
| 3,979,472 | 9/1976 | Butter | 260/668 R |
| 4,007,231 | 2/1977 | Butter | 260/672 T |
| 4,025,458 | 5/1977 | McKay | 208/113 X |
| 4,031,002 | 6/1977 | McKay | 208/113 |
| 4,036,740 | 7/1977 | Readal et al. | 208/120 |
| 4,111,845 | 9/1978 | McKay | 208/120 |
| 4,148,712 | 4/1979 | Nielsen et al. | 208/78 |
| 4,148,714 | 4/1979 | Nielsen et al. | 208/114 |
| 4,153,536 | 5/1979 | McKay | 208/120 |

OTHER PUBLICATIONS

Coates, "Organo-Metallic Compounds", 2nd Edition, pp. 214–225, (1960), John Wiley & Sons, New York.

*Primary Examiner*—W. J. Shine
*Assistant Examiner*—G. E. Schmitkons

[57] ABSTRACT

A cracking catalyst is treated with a trihydrocarbylantimony oxide to passivate contaminating metals whenever these metals have been deposited on the catalyst. Unused or used catalyst can be treated. A process for cracking a hydrocarbon, e.g. hydrocarbon oil, is disclosed.

20 Claims, No Drawings

PASSIVATION OF METALS CONTAMINATING A CRACKING CATALYST WITH TRIHYDROCARBYLANTIMONY OXIDE AND PROCESS FOR CONVERTING HYDROCARBONS

This is a divisional of Ser. No. 926,694, filed July 25, 1978, now abandoned.

This invention relates to catalytic cracking of hydrocarbon. In one of its aspects the invention relates to treating a catalyst to passivate contaminating metals whenever these metals appear on the catalyst. In another of its aspects the invention relates to a process for the cracking of a hydrocarbon employing a catalyst which can be contaminated with metals tending to deactivate the same, the catalyst having been treated to passivate such metals or metal whenever these appear on the catalyst.

In one of its concepts the invention provides a method for treating a cracking catalyst to passivate contaminating metals whenever these appear on the catalyst by applying to the catalyst, used or unused, a trihydrocarbylantimony oxide. In another of its concepts the invention provides a process for the cracking of a hydrocarbon employing a catalyst which has been modified or on which metals, when these appear thereon, have been passivated by use of a trihydrocarbylantimony oxide, as described herein.

Hydrocarbon feedstock containing higher molecular weight hydrocarbons is cracked by contacting it at an elevated temperature with a cracking catalyst whereby light distillates such as gasoline are produced. However, the cracking catalyst gradually deteriorates during this process. One reason for this deterioration is the deposition of contaminating metals such as nickel, vanadium, and iron on the catalyst resulting in increased production of hydrogen and coke and decreased catalyst activity for cracking. Furthermore, the conversion of hydrocarbons into gasoline is reduced by these metals. Therefore, there is a need for a cracking process which will prevent or reduce the deleterious effects of these metal contaminants.

The modification or protection of the catalyst against the described deterioration presents a challenge because, of course, the modification should not unacceptably alter the desirable characteristics of the product, e.g. gasoline, to be produced.

U.S. Pat. No. 3,711,422, Marvin M. Johnson and Donald C. Tabler, Jan. 16, 1973, discloses and claims restoring the activity of a cracking catalyst with a compound of antimony, e.g. antimony triphenyl. U.S. Pat. Nos. 4,025,458, May 24, 1977, and 4,031,002, June 21, 1977, Dwight L. McKay, disclose and claim passivating metals on a cracking catalyst with antimony compounds which are phosphorodithioates, as described in the patents.

It is an object of this invention to provide a method for passivating a catalyst having contaminating metals thereon. It is another object of the invention to treat a catalyst suitable for cracking a hydrocarbon, e.g. a hydrocarbon oil, to passivate contaminating metals, e.g. vanadium, iron and/or nickel, whenever these appear thereon, to render the same more effective for its intended use. It is a further object of the invention to provide an improved hydrocarbon cracking operation.

Other aspects, concepts, objects and the several advantages of the invention are apparent from a study of this disclosure and the appended claims.

According to the present invention, a catalyst suitable for cracking hydrocarbon, e.g. a hydrocarbon oil, is treated by addition thereto of a trihydrocarbylantimony oxide, so that whenever contaminating metals, e.g. vanadium, iron and/or nickel appear thereon, these will be passivated.

The catalyst treated can be a used or unused catalyst.

Also, according to the invention, there is provided a hydrocarbon cracking operation employing the modified or treated catalyst of the invention.

When the catalyst is an unused cracking catalyst it is treated with a trihydrocarbylantimony oxide to reduce its susceptibility to the deleterious effects of later-deposited vanadium, iron, and/or nickel. Thus, according to the invention, a new or used conventional cracking catalyst is contacted with at least one trihydrocarbylantimony oxide to provide an antimony-containing cracking catalyst useful for cracking of hydrocarbons containing contaminating metals such as nickel, vanadium, and iron, the antimony resulting in the catalyst serving to at least partially overcome the deleterious effects of the contaminating metals. This is so whether these contaminating metals are present on the catalyst prior to the contacting of the catalyst with the trihydrocarbylantimony oxide or the contaminating metals are deposited from the metals-containing feedstock onto the antimony-containing catalyst.

The cracking catalyst which is contacted with the trihydrocarbylantimony oxide can be any of those which are conventionally employed in the cracking of hydrocarbons boiling above about 400° F. (204° C.) for the production of motor fuel blending components and light distillates. These catalysts generally contain silica or silica-alumina, such materials frequently being associated with zeolitic materials. These zeolitic materials can be naturally occurring, or they can be produced by conventional ion exchange methods so as to provide metallic ions which improve the activity of the catalyst. Rare earth metals, including cerium, are frequently used for this purpose. Zeolite-modified silica-alumina catalysts are particularly applicable. Examples of cracking catalysts into which the trihydrocarbylantimony oxide can be incorporated include hydrocarbon-cracking catalysts obtained by admixing an inorganic oxide gel with an aluminosilicate and aluminosilicate compositions which are strongly acidic as a result of treatment with a fluid medium containing at least one rare earth metal cation and a hydrogen ion or ion capable of conversion to a hydrogen ion. The unused catalytic cracking material employed will generally be in particulate form having a particle size principally in the range of about 10 to about 200 microns.

If desired, the cracking catalyst can contain a combustion promoter such as platinum or chromium.

Trihydrocarbylantimony oxides which can be employed in this invention can be represented by the formula $R_3SbO$, where each R is selected from the group consisting of alkyl, cycloalkyl, and aryl, and combinations thereof such as alkaryl, aralkyl, and the like, the number of carbon atoms in each R being within the range of 1 to about 18.

Examples of some trihydrocarbylantimony oxides which can be used include trimethylantimony oxide, triethylantimony oxide, tripropylantimony oxide, triisobutylantimony oxide, trihexylantimony oxide, tris(2-ethyloctyl)antimony oxide, trioctadecylantimony oxide, tricyclohexylantimony oxide, tris(3-methylcyclopentyl)antimony oxide, tris(cyclopentylmethyl)antimony oxide, triphenylantimony oxide, tri-p-tolylantimonyoxide, tribenzylantimony oxide, butyldiphenylantimony oxide, dodecyldicyclohexylantimony oxide, and the like, and mixtures thereof. Triphenylantimony oxide is the trihydrocarbylantimony oxide presently preferred.

The manner in which the conventional cracking catalyst is contacted with the trihydrocarbylantimony oxide is not critical. For example, the trihydrocarbylantimony oxide in finely divided form can be mixed with the conventional cracking catalyst in ordinary manner such as by rolling, shaking, stirring, or the like. Alternatively, the trihydrocarbylantimony oxide can be dissolved or dispersed in a suitable solvent or liquid, e.g. water or hydrocarbon, and the resulting solution or dispersion can be used to impregnate the conventional cracking catalyst, followed by volatilization of the liquid. If desired, the trihydrocarbylantimony oxide can be dissolved or dispersed in the hydrocarbon feedstock to the cracking process, in which instance the hydrocarbon feedstock and the trihydrocarbylantimony oxide contact the cracking catalyst at about the same time.

Although the ratio of trihydrocarbylantimony oxide to conventional cracking catalyst can vary over a wide range, depending in part on the concentration of contaminating metals in the catalyst and in the hydrocarbon feedstock to be cracked, the trihydrocarbylantimony oxide generally will be used in an amount such as to provide within the range of about 0.002 to about 5, preferably about 0.01 to about 1.5, parts by weight antimony per 100 parts by weight conventional cracking catalyst, i.e. including any contaminating metals in the catalyst but excluding the trihydrocarbylantimony oxide.

The cracking process in which the antimony-containing cracking catalyst is employed is basically an improvement over a conventional cracking process which employs a conventional cracking catalyst. Although the antimony-containing cracking catalyst can be employed in a catalytic cracking process employing a fixed catalyst bed, it is especially useful in a fluid catalyst cracking process.

In a process for cracking topped crude oil containing metal contaminates a metals-contaminated fluidized cracking catalyst to which antimony had been added in the form of triphenylantimony oxide was more active and provided more gasoline, less coke, and less hydrogen than a comparable catalyst to which no antimony had been added. The catalyst was found to be even more active and to provide even more gasoline than a comparable catalyst to which antimony had been added using antimony tris(O,O-dipropyl phosphorodithioate).

A preferred embodiment of the cracking process of this invention utilizes a cyclic flow of catalyst from a cracking zone to a regeneration zone. In this process, a hydrocarbon feedstock containing contaminating metals such as nickel, vanadium, or iron is contacted in a cracking zone under cracking conditions and in the absence of added hydrogen with an antimony-containing cracking catalyst produced by use of a trihydrocarbylantimony oxide as described above; a cracked product is obtained and recovered; the cracking catalyst is passed from the cracking zone into a regeneration zone; and in the regeneration zone the cracking catalyst is regenerated by contacting the cracking catalyst with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst by unused cracking catalyst continuously or intermittently. Generally, about 0.5 to about 6 weight percent of the total cracking catalyst is replaced daily by a fresh cracking catalyst. The actual quantity of the catalyst replaced depends in part upon the nature of the feedstock used. The makeup quantity of cracking catalyst can be added at any location in the process. Preferably, however, the cracking catalyst that is makeup catalyst is introduced into the regenerator in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally done with steam.

In carrying out the present invention the specific conditions in the cracking zone and in the regeneration zone are not critical but will depend upon several parameters such as the feedstock used, the catalyst used, and the results desired. Preferably, and most commonly, the cracking and regeneration conditions can be conventional and will be within the following ranges:

| | Cracking Zone: |
|---|---|
| Temperature: | 800° F. to 1200° F. (427–649° C.) |
| Time: | 1–40 seconds |
| Pressure: | Subatmospheric to 3,000 psig |
| Catalyst:Oil Ratio: | 3:1 to 30:1, by weight |
| | Regeneration Zone: |
| Temperature: | 1000° F. to 1500° F. (538–816° C.) |
| Time: | 2–70 minutes |
| Pressure: | Subatmospheric to 3,000 psig |
| Air @ 60° F. (16° C.) | 100–250 Ft$^3$/lb coke |
| and 1 atm: | (6.2–15.6m$^3$/kg coke) |

The feedstocks employed in the catalytic cracking process of this invention which contain metal contaminants such as nickel, vanadium, and iron include those which are conventionally utilized in catalytic cracking processes to produce gasoline and light distillate fractions from heavier hydrocarbon feedstocks. These feedstocks have an initial boiling point above about 400° F. (204° C.) and include fluids such as gas oils, fuel oils, topped crudes, shale oils, oils from tar sands, oils from coal, mixtures of two or more of these, and the like. By "topped crude" is meant those oils which are obtained as the bottoms of a crude oil fractionator. If desired, all or a portion of the feedstock can constitute an oil from which a portion of the metal content previously has been removed, e.g. by hydrotreating or solvent extraction.

Typically the feedstock utilized in the process of this invention will contain one or more of the metals nickel, vanadium, and iron within the ranges shown in Table I.

TABLE I

| Metal | Metal Content of Feedstocks, ppm[1] |
|---|---|
| Nickel | 0.02 to 100 |
| Vanadium | 0.02 to 500 |
| Iron | 0.02 to 500 |

TABLE I-continued

| Metal | Metal Content of Feedstocks, ppm[1] |
|---|---|
| Total Metals | 0.2 to 1100[2] |

[1] The ppm metal content refers to the feedstock as used.
[2] Total metals in this table and elsewhere refers to the sum of the nickel, vanadium, and iron contents in the feedstock that are effective in contaminating the catalyst; the total metals content can be determined in accordance with methods well known in the art, e.g. by atomic absorption spectroscopy.

One of the most important embodiments of this invention resides in a heavy oil cracking process. The known commercial heavy oil cracking process is capable of cracking heavy oils having a metals content of up to 80 ppm of total effective metals, i.e. metals in any form detrimental to the cracking process. Economically marginal results are obtained with oils having 40 to 80 ppm of total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. Thus, known heavy oils with total metals contents from 80 to 300 ppm that heretofore could not be directly used for fuel production and in particular for gasoline production in accordance with this invention can be cracked to yield gasoline and other fuel blending components. Most preferably the concentration of antimony in the antimony-containing cracking catalyst used in the process of this invention for cracking these heavily metal-loaded oils is related to the average total effective metals content of the feedstock as shown in Table II.

TABLE II

| Total Effective Metals in Feedstock, ppm | Antimony Concentration in Catalyst, Weight %[1] |
|---|---|
| 40–100 | 0.05–0.8 |
| 100–200 | 0.1–1 |
| 200–300 | 0.15–1.5 |
| 300–800 | 0.2–2 |

[1] Based on weight of catalyst prior to addition of trihydrocarbylantimony oxide.

EXAMPLE

A commercial cracking catalyst comprising amorphous silica-alumina associated with zeolitic material, which had been used in a commercial cracking unit and subsequently subjected to regeneration in the laboratory, was employed in tests which demonstrated the value of using triphenylantimony oxide in improving a cracking catalyst contaminated with metals detrimental to a cracking process. Properties of the used cracking catalyst prior to regeneration in the laboratory are shown in Table III.

TABLE III

| | |
|---|---|
| Surface area, m²/g | 74.3 |
| Pore volume, ml/g | 0.29 |
| Composition, weight % | |
| Aluminum | 21.7 |
| Silicon | 24.6 |
| Nickel | 0.38 |
| Vanadium | 0.60 |
| Iron | 0.90 |
| Cerium | 0.40 |
| Sodium | 0.39 |
| Carbon | 0.06 |

The used commercial cracking catalyst having the properties shown in Table III was then subjected to regeneration in the laboratory by heating the catalyst while fluidized with air to 1200° F. (649° C.) and maintaining it at that temperature for about 0.5 hour while fluidized with air. The catalyst was then cooled to room temperature (about 25° C.) while fluidized with nitrogen, and the resulting catalyst, herein designated as catalyst O, was employed as shown below.

A portion of catalyst O was used in the preparation of a composition containing 0.097 parts by weight antimony per 100 parts by weight catalyst O, the antimony being employed as triphenylantimony oxide. In the preparation of this composition, 51.62 g. of catalyst O was impregnated with 587 ml of toluene solution containing 0.1514 g. triphenylantimony oxide, the impregnation being carried out stepwise by the addition of the toluene solution in six increments. After each stepwise addition of the toluene solution, the treated catalyst was heated to apparent dryness in a hot plate, and the dried composition was then charged to a quartz reactor in which it was fluidized with nitrogen and heated to 700° F. (272° C.), after which the fluidizing gas was changed to air and the catalyst composition was heated to 1100° F. (593° C.) and maintained at that temperature for 5 to 10 minutes, after which it was cooled to room temperature (about 25° C.) while fluidized with nitrogen. The resulting catalyst composition is herein designated as catalyst TAO.

A second portion of the catalyst O was used in the preparation of a composition containing 0.10 parts by weight antimony per 100 parts by weight catalyst O, the antimony being employed as antimony tris(O,O-dipropyl phosphorodithioate). In this preparation catalyst O, after being dried in a fluid bed at 900° F. (482° C.), was mixed with the calculated amount of a cyclohexane-mineral oil solution of antimony tris(O,O-dipropyl phosphorodithioate) containing 0.0147 g. antimony per ml solution. The treated catalyst was then heated to apparent dryness, after which the dried catalyst composition was transferred to a quartz reactor and heated to 900° F. (482° C.) as a bed fluidized with nitrogen, followed by regeneration at 1100° F. (593° C.) while fluidized with air. The catalyst composition was then preaged by processing it through ten cracking-regeneration cycles as a confined fluid bed in a quartz reactor using topped West Texas crude oil as feed. Each cycle consisted of a nominal 0.5-minute oil feed time to the catalyst fluidized with nitrogen during the cracking step conducted at about 950° F. (510° C.), followed by stripping of hydrocarbons from the system by fluidization of the catalyst for 3 to 5 minutes with nitrogen, followed by regeneration of the catalyst while heating to about 1200° F. (649° C.) for about 1 hours while fluidized with air. The catalyst was then cooled to room temperature (about 25° C.) while fluidized with nitrogen to provide a catalyst herein designated as catalyst ATDP.

Although the procedures used in the preparation of catalysts O, ATDP, and TAO included some variations other than the use or lack of use of a particular modifying agent comprising antimony, these other variations were not such as would be expected to have a significant effect on the results obtained in the subsequent evaluation of the catalysts in cracking tests.

Catalysts O, ATDP, and TAO were evaluated in three series of cracking-regeneration cycles, in which the cracking step was conducted over a range of catalyst:oil ratios, using approximately 35 g of catalyst as a confined fluid bed in a quartz reactor and employing topped West Texas crude oil as the feedstock in the cracking step. In each cycle the cracking step was carried out at 950° F. (510° C.) and about atmospheric pressure for 0.5 minute, and the regeneration step was conducted at about 1200° F. (649° C.) and about atmospheric pressure for approximately one hour using fluidizing air, the reactor being purged with nitrogen before and after each cracking step.

Properties of the topped West Texas crude oil used in this Example are shown in Table IV.

TABLE IV

| | |
|---|---|
| API gravity @ 60° F. (16° C.)[1] | 21.4 |
| Distillation, °F. (°C.)[2] | |
| IBP | 556 (291) |
| 10% | 803 (428) |
| 20% | 875 (468) |
| 30% | 929 (498) |
| 40% | 982 (528) |
| 50% | 1031 (555) |
| Carbon residue, Rams, wt %[3] | 5.5 |
| Elemental analysis | |
| S, wt % | 1.2 |
| Ni, ppm | 5.24 |
| V, ppm | 5.29 |
| Fe, ppm | 29 |
| Pour Point, °F. (°C.)[4] | 63 (17) |
| Kinematic viscosity, cSt[5] | |
| @ 180° F. (82° C.) | 56.5 |
| @ 210° F. (99° C.) | 32.1 |
| Refractive index @ 67° C.[6] | 1.5 |

[1] ASTM D 287-67
[2] ASTM D 1160-61
[3] ASTM D 524-64
[4] ASTM D 97-66
[5] ASTM D 445-65
[6] ASTM D 1747-62

Typical results of the cracking tests are summarized in Table V. The conversion and yield results shown for the two catalyst:oil weight ratios given were determined graphically from curves which were drawn to represent values for conversion and yields as determined experimentally at the various catalyst:oil ratios employed.

TABLE V

| Catalyst | Catalyst: Oil Wt. Ratio | Conversion, Vol. % of Feed | Gasoline, Vol. % of Feed | Coke, Wt. % of Feed | H$_2$, SCF/bbl Feed Converted |
|---|---|---|---|---|---|
| 0 | 5.2 | 70 | 56 | 13.0 | 700 |
| ATDP | 5.2 | 68.6 | 55.2 | 12.0 | 460 |
| TAO | 5.2 | 72 | 57.6 | 12.05 | 486 |
| 0 | 7.4 | 75 | 54.8 | 16.4 | 800 |
| ATDP | 7.4 | 76 | 58.5 | 14.9 | 515 |
| TAO | 7.4 | 77.5 | 61.7 | 13.85 | 554 |

Thus, at the same catalyst:oil weight ratio, the catalyst prepared by use of triphenylantimony oxide, when compared with the catalyst prepared by use of antimony tris(O,O-dipropyl phosphorodithioate), provided higher feed conversion and higher gasoline yield and gave acceptably low levels of coke and hydrogen which were lower than those obtained with the catalyst to which no antimony had been added.

Reasonable variation and modification are possible within the scope of the foregoing disclosure and the appended claims to the invention the essence of which is that a hydrocarbon cracking catalyst, e.g., a catalyst useful for cracking a hydrocarbon oil containing metals which when deposited on the catalyst will contaminate the same, e.g., vanadium, iron, and/or nickel, has been modified to passivate said metal whenever they appear on the catalyst and that a process employing such a modified cracking catalyst has been set forth, as described.

I claim:

1. A method for passivating a contaminant metal on a hydrocarbon cracking catalyst which comprises adding to said catalyst at least one trihydrocarbylantimony oxide.

2. A method according to claim 1 wherein the contaminating metal is at least one of vanadium, iron and nickel and the trihydrocarbylantimony oxide can be represented by the formula R$_3$SbO, where each R is selected from the group consisting of alkyl, cycloalkyl, and aryl, and combinations thereof such as alkaryl and aralkyl, the number of carbon atoms in each R being within the range of 1 to about 18.

3. A method according to claim 1 wherein the cracking catalyst contains at least one of silica and silica-alumina, and a zeolite.

4. A method according to claim 1 wherein the catalyst is treated to passivate the contaminated metal whenever it appears on the catalyst.

5. A method according to claim 1 wherein the catalyst is a used catalyst.

6. A method according to claim 1 wherein the catalyst is a catalyst which has been used for cracking a hydrocarbon oil containing contaminating metal.

7. A process for cracking a hydrocarbon oil feedstock to produce gasoline therefrom which comprises contacting the same under cracking conditions with a cracking catalyst which has been modified with a modifying amount of treating agent comprising at least one trihydrocarbylantimony oxide in an amount sufficient to passivate metals which can deactivate said catalyst for effective cracking of said feedstock when said metals are on said catalyst.

8. A method according to claim 1 wherein the antimony compound is at least one selected from trimethylantimony oxide, triethylantimony oxide, tripropylantimony oxide, triisobutylantimony oxide, trihexylantimony oxide, tris(2-ethyloctyl)antimony oxide, trioctadecylantimony oxide, tricyclohexylantimony oxide, tris(3-methylcyclopentyl)antimony oxide, tris(cyclopentylmethyl)antimony oxide, triphenylantimony oxide, tri-p-tolylantimony oxide, tribenzylantimony oxide, butyldiphenylantimony oxide and dodecyldicyclohexylantimony oxide.

9. A process according to claim 7 for cracking a hydrocarbon in the presence of a hydrocarbon cracking catalyst which has been treated with at least one antimony compound of claim 8.

10. A process according to claim 9 wherein the antimony compound is triphenylantimony oxide.

11. A method according to claim 1 wherein the oxide is present in an amount to provide about 0.002 to about 5 parts per hundred parts by weight of antimony.

12. A method according to claim 11 wherein the oxide is present in an amount to provide about 0.002 to about 1.5 parts per hundred parts by weight of antimony.

13. A method according to claim 12 wherein the oxide is present in an amount to provide about 0.01 to about 1.5 parts per hundred parts by weight of antimony.

14. A method according to claim 2 wherein the oxide is present in an amount to provide about 0.002 to about 5 parts per hundred parts by weight of antimony.

15. A method according to claim 14 wherein the oxide is present in an amount to provide about 0.002 to about 1.5 parts per hundred parts by weight of antimony.

16. A method according to claim 15 wherein the oxide is present in an amount to provide about 0.01 to about 1.5 parts per hundred parts by weight of antimony.

17. A method according to claim 3 wherein the oxide is present in an amount to provide about 0.002 to about 5 parts per hundred parts by weight of antimony.

18. A method according to claim 17 wherein the oxide is present in an amount to provide about 0.002 to about 1.5 parts per hundred parts by weight of antimony.

19. A method according to claim 18 wherein the oxide is present in an amount to provide about 0.01 to about 1.5 parts per hundred parts by weight of antimony.

20. A method for passivating a contaminant metal on a hydrocarbon oil cracking catalyst suited to produce gasoline from said oil which comprises adding to said catalyst at least one trihydrocarbylantimony oxide.

* * * * *